J. McFETRIDGE.
PROCESS OF MAKING SULFURIC ANHYDRID.
APPLICATION FILED NOV. 21, 1908.
988,646.
Patented Apr. 4, 1911.
2 SHEETS—SHEET 2.
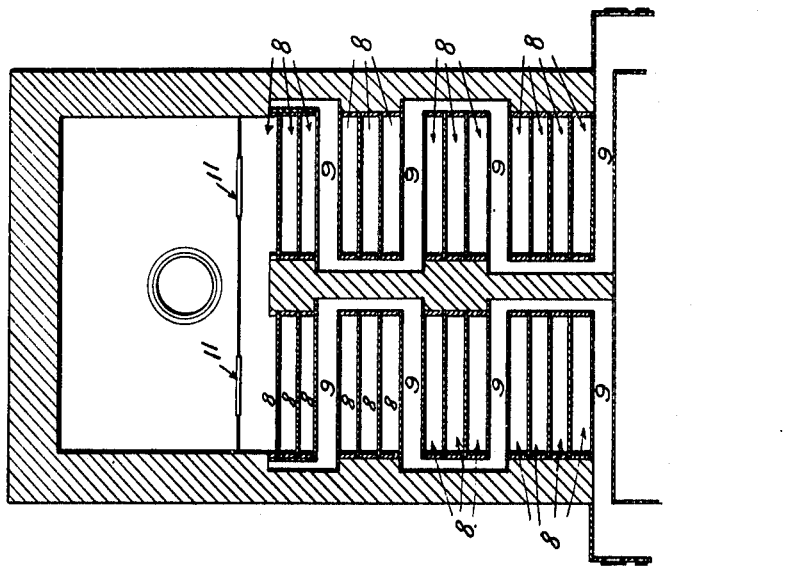
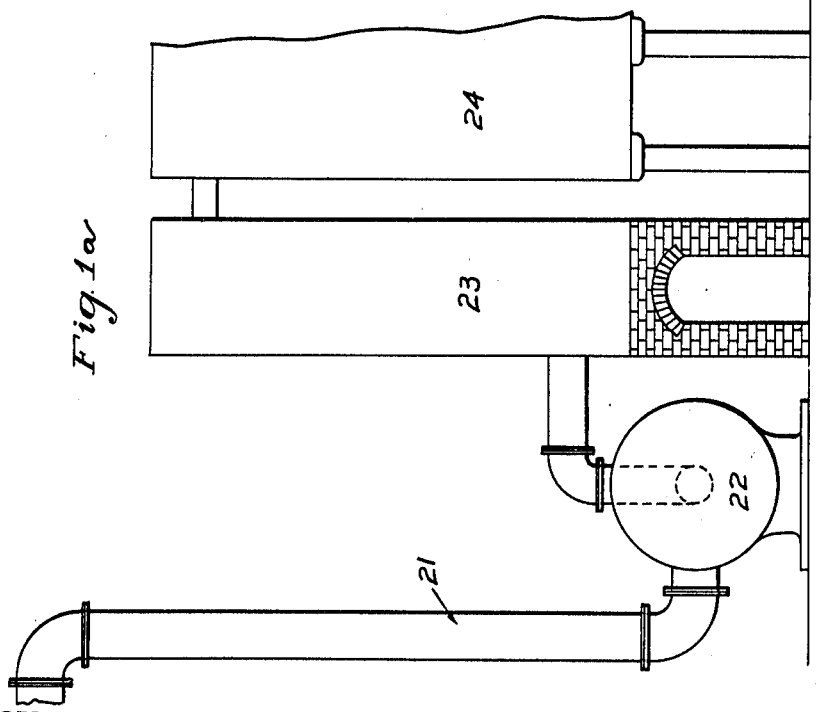

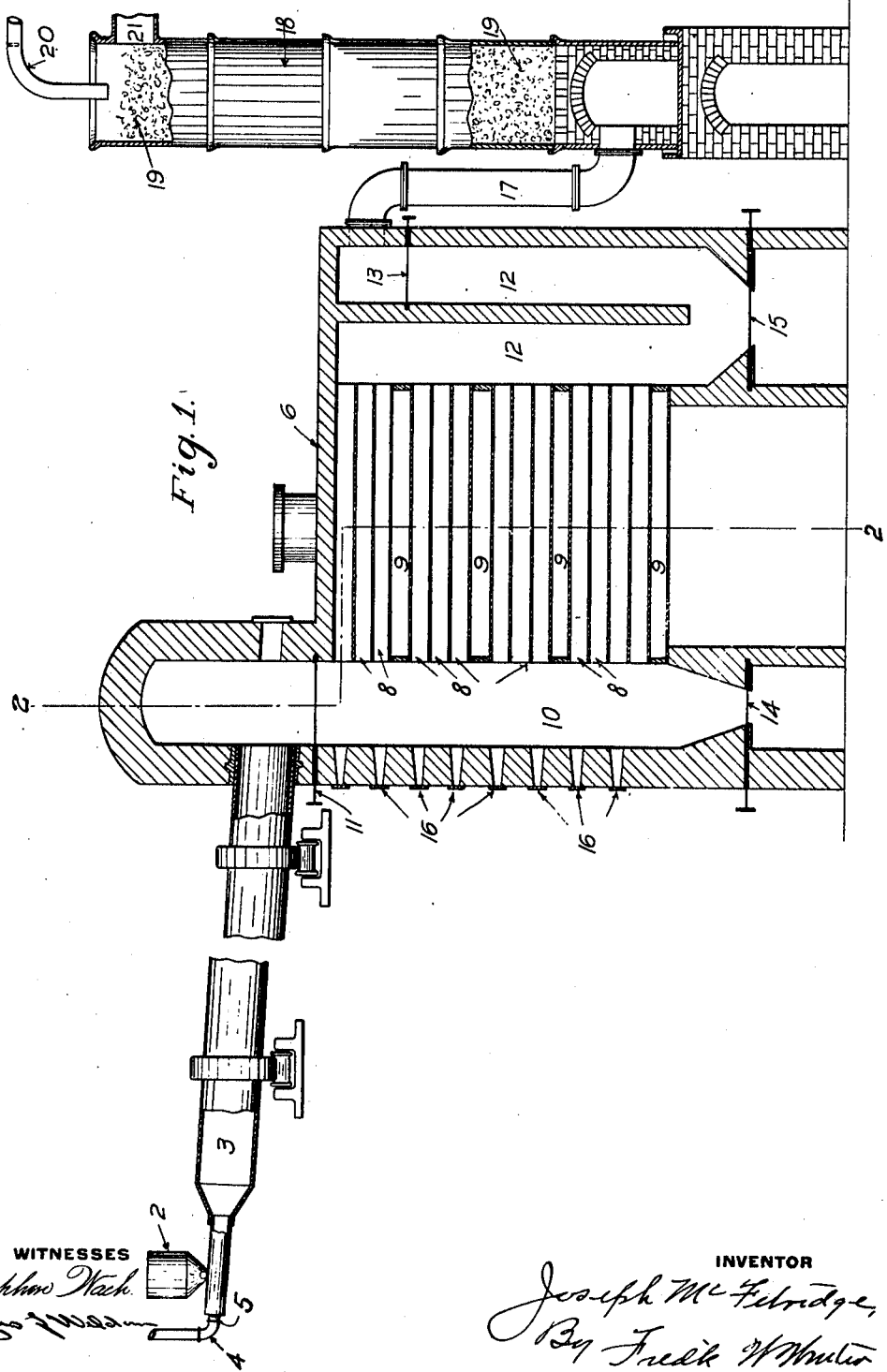

UNITED STATES PATENT OFFICE.

JOSEPH McFETRIDGE, OF VANDERGRIFT, PENNSYLVANIA.

PROCESS OF MAKING SULFURIC ANHYDRID.

988,646.  Specification of Letters Patent.  Patented Apr. 4, 1911.

Application filed November 21, 1908. Serial No. 463,909.

*To all whom it may concern:*

Be it known that I, JOSEPH McFETRIDGE, a resident of Vandergrift, in the county of Westmoreland and State of Pennsylvania, have invented a new and useful Improvement in Processes of Manufacturing Sulfuric Acid from Sulfid Ores, of which the following is a specification.

This invention relates to a process of manufacturing sulfuric anhyrid from iron and copper pyrites, sulfid ores, and mattes resulting from the treatment of such ores.

The object of the invention is to simplify the operation of making sulfuric acid and cheapen the process.

Heretofore the practice has been to crush the ore to egg size lumps and separate the fine portion by passing the crushed mass over $\frac{1}{4}$ to $\frac{1}{2}$ inch mesh sieves. The fine portion of ore will range in size from fine powder to pea size lumps, and is known to the trade as fines. The methods now in use are to burn the lump ore in kilns or burners, and the fines in shelf burners or mechanical furnaces, and convert the sulfurous anhydrid resulting from the combustion of the sulfur into sulfuric anhydrid or hydrated sulfuric acid by the well known contact or chamber process.

The well known contact process necessitates the use of one or more contact shafts which are charged and discharged at intervals with pyrites cinders or other forms of ferric oxid, and separate compartments containing metallic contact substance over which the sulfurous anhydrid is passed and converted catalytically into sulfuric anhydrid. By my process the procedure is simplified and the oxids formed by burning sulfur bearing material, such as pyrites, sulfid ores, or mattes, are made to act as the contact substance, so that in the operation of burning the ore and collecting the oxids, 30 to 40 per cent. of the sulfurous anhydrid is converted into sulfuric anhydrid.

In carrying out my process, sulfur bearing ores or mattes, preferably fines, on account of their low commercial value, are ground to an impalpable powder. This is then fed into a furnace, kiln or shaft, heated to a temperature high enough to ignite the sulfur, preferably being fed by an air blast or drawn into the furnace by a fan or blower suction. The pulverulent ore is at once ignited, with formation of sulfurous anhydrid and metallic oxids. The finely divided metallic oxids are carried along in the furnace with the mixture of sulfurous anhydrid and air, and being in such a fine state of division, act at once as a catalyzer, converting 30 to 40 per cent. of the sulfurous anhydrid into sulfuric anhydrid, and at the same time the gases are purified by the removal of arsenic and the like by their intimate contact with the fine, non volatile oxids. The spent metallic oxids are then separated from the gas. The resulting sulfuric anhydrid is absorbed in strong sulfuric acid in the well known absorption towers, and the remaining sulfurous anhydrid converted into sulfuric anhydrid by the continuance of the contact process or into hydrated sulfuric acid by the well known chamber process.

In the accompanying drawings, which illustrate one form of an apparatus that may be used in carrying out my invention, Figures 1 and 1$^a$ show in part a side elevation and in part a vertical section, and Fig. 2 a section on the line 2—2, Fig. 1.

The form of apparatus can be varied in construction without departing from the invention. The grinding can be effected by any suitable apparatus. The fine ore is fed into the sealed feed hopper 2 and injected therefrom into furnace 3 by air under pressure admitted through pipe 4. Additional air is admitted in regulated quantities through opening 5. The furnace 3 is of the rotary cylindrical type and is preheated to such temperature, from 1250 to 1500 degrees Fahrenheit, as to ignite the sulfur in the fine ore. After being once started the burning of the sulfur maintains the heat of the furnace. When the ore strikes the hot zone of furnace 3 the combustion of sulfur is instantaneous, with formation of sulfurous anhydrid, sulfuric anhydrid and metallic oxids.

Apparatus 6 comprises two parallel rectangular chambers, each of which contain a number of superposed horizontal dust collecting shelves 8 and temperature regulating flue 9. At one end is a vertical gas-supply passage 10 controlled by valve 11 and having hopper 14 at its bottom, and at the other end is a gas-discharge passage 12 controlled by valve 13, and provided with hopper 15 in its bottom.

The mixture of sulfuric anhydrid, sulfurous anhydrid, metallic oxids, and air in regulated quantities, are drawn through furnace 3 by suction produced by fan 22, into dust collector 6 through vertical supply pipe 10. The heavy particles of ore drop to bottom of vertical passage 10 and are removed through discharge hopper 14. The fine oxids are carried with the mixture of sulfuric anhydrid, sulfurous anhydrid and air, from gas-supply passage 10 over dust collecting shelves 8 where the fine oxids are deposited. The fine ore collected on shelves 8 is discharged into passages 10 and 12 by mechanical or hand rakes operated through cleaning doors 16. The spent ore is removed from passages 10 and 12 through discharge hoppers 14 and 15.

The sulfuric anhydrid formed in the furnace 3 and dust collector 6, and the unconverted sulfurous anhydrid and air are drawn from dust collector 6 by means of suction produced by fan 22, through the cast iron pipe 17 to the absorption tower 18 which is packed with acid resisting material 19. The sulfuric anhydrid is absorbed in strong sulfuric acid fed to the tower through pipe 20. The unconverted sulfurous anhydrid and air are drawn from tower 18 through pipe 21 and forced by fan 22 into Glover tower 23 and chamber 24, where the sulfurous anhydrid is converted into hydrated sulfuric acid by oxidation and hydration by the well known chamber process.

During the passage of the mixture of sulfur gases, air and metallic oxids through the furnace and dust collector, in which a temperature of from 1250 to 1500 degrees Fahrenheit is maintained, 30 to 40 per cent. of sulfuric anhydrid is formed, and arsenic and the like removed.

The catalytic action takes place simultaneously with the burning of the ore in the furnace proper and in the dust collector instead of in a separate contact shaft as heretofore.

What I claim is:

1. The process of manufacturing sulfuric anhydrid from metallic sulfids, consisting in reducing said sulfids to a pulverulent condition, then injecting the same in a thin stream together with a regulated volume of air into a furnace heated to a temperature high enough to at once ignite the sulfur and convert it into sulfurous anhydrid, and carrying the gases so produced along with the fine metallic oxids so produced and air, and by contact with said oxids converting the sulfurous anhydrid into sulfuric anhydrid.

2. The process of manufacturing sulfuric anhydrid from metallic sulfids, consisting in reducing said sulfids to a fine powder, then injecting the same by means of an air blast of regulated volume into a furnace heated to a temperature high enough to at once ignite the sulfur, decomposing the sulfur bearing material, forming sulfurous anhydrid and metallic oxids, and carrying the gases so produced in contact with the fine oxids so produced and air, whereby catalytic action converts sulfurous anhydrid into sulfuric anhydrid.

3. The process of manufacturing sulfuric anhydrid from metallic sulfids, consisting in reducing said sulfids to a fine powder, then projecting the same by means of a blast and suction into a furnace heated to a temperature high enough to at once ignite the sulfur, decomposing the sulfur bearing material forming sulfurous anhydrid and metallic oxids, and carrying the gases so produced in contact with the fine metallic oxids so produced, thereby purifying the gases by freeing them from arsenic and the like, and by the catalytic action of said oxids converting the sulfurous anhydrid into sulfuric anhydrid.

In testimony whereof, I have hereunto set my hand.

JOSEPH McFETRIDGE.

Witnesses:
R. G. SCOTT, Jr.,
W. L. DAVIS.